United States Patent [19]
Bansal et al.

[11] Patent Number: 5,541,488
[45] Date of Patent: Jul. 30, 1996

[54] METHOD AND APPARATUS FOR CONTROLLING INDUCTION MOTORS

[75] Inventors: Madan Bansal; Gregory I. Rozman, both of Rockford; William S. Heglund, Davis Junction; Shan-chin Tsai; Mario R. Rinaldi, both of Rockford, all of Ill.

[73] Assignee: Sundstrand Corporation, Rockford, Ill.

[21] Appl. No.: 226,188

[22] Filed: Apr. 11, 1994

[51] Int. Cl.$^6$ .................................................... H02P 7/00
[52] U.S. Cl. ............................................ 318/801; 318/807
[58] Field of Search .................................. 318/798–816

[56] References Cited

U.S. PATENT DOCUMENTS

| | | | |
|---|---|---|---|
| 3,514,684 | 5/1970 | Schaffersmann | 318/227 |
| 4,361,794 | 11/1982 | Kawada et al. | 318/800 |
| 4,384,244 | 5/1983 | Matsumoto | 318/803 |
| 4,424,474 | 1/1984 | Durr et al. | 318/798 |
| 4,442,398 | 4/1984 | Bertals et al. . | |
| 4,484,128 | 11/1984 | Jotten et al. | 318/805 |
| 4,503,376 | 3/1985 | Okuyama | 318/802 |
| 4,533,862 | 8/1985 | Salihi | 318/798 |
| 4,593,240 | 6/1986 | Blaschke | 318/800 |
| 4,808,903 | 2/1989 | Matsui et al. | 318/800 |
| 4,818,890 | 4/1989 | Mose et al. | 290/52 |
| 4,839,589 | 6/1989 | Heinle . | |
| 4,870,339 | 9/1989 | Furukawa et al. . | |
| 5,187,419 | 2/1993 | DeLange | 318/805 |
| 5,296,796 | 3/1994 | Clower | 318/808 |

OTHER PUBLICATIONS

Article entitled: "*A Novel Position Sensor Elimination Technique for the Interior Permanent–Magnet Synchronous Motor Drive*" written by Ashok B. Kulkarni and Mehrdad Ehsani, printed in IEEE Transactions On Industry Applications, vol. 28, No. 1 Jan./Feb. 1992.

Article entitled: "*Vector Control of Induction Motor Without Shaft Encoder*" by Tsugutoshi Ohtani, Noriyuka Takada, and Koji Tanaka and published in IEEE Transactions On Industry Applications, vol. 28, No. 1, Jan./Feb. 1992.

Article entitled: "*Brushless dc Motor Control without Position and Seed Sensors*" written by Nobuyuki Matsui and Masakane Shigyo, published in IEEE Transactions On Industry Applications, vol. 28, No. 1, Jan./Feb. 1992.

Article entitled: "*Implementation of Direct Stator Flux Orientation Control on a Versatile DSP Based System*" written by Xingyi Xu and Donald W. Novotny published in IEEE Transactions On Industry Applications, vol. 27, No. 4, Jul./Aug. 1991.

Article entitled: "*Rotor Position Detection Techniques for Brushless Permanent–Magnet and Reluctance Motor Drives*" written by P. W. Lee and C. Pollock, University of Warwick, Coventry CV4 7AL, United Kingdom.

*Primary Examiner*—Jonathan Wysocki
*Attorney, Agent, or Firm*—Ryan M. Fountain; Jeffery J. Makeever

[57] ABSTRACT

The present invention provides for detecting rotor speed through the use of sense coils on the stator teeth. Voltage ripples caused by the rotor slots is detected by combining the signals of several such sense coils so that the fundamental voltage signal is cancelled or rejected and only the ripple voltages remain, a signal proportional to rotor speed. Several alternative methods for implementing that technique are discussed herein. At low induction motor speeds, the present invention filters out the voltage ripples and incident third harmonics and instead estimates rotor speed from the fundamental voltage. When the induction motor is already being driven by a prime mover, the present invention selects a proper initial frequency command for initial motor start by identifying rotor speed from the PWM inverter. Further, the present invention provides for using a generator to control voltage to the induction motor, with a PWM inverter to control frequency signals to the induction motor.

17 Claims, 12 Drawing Sheets

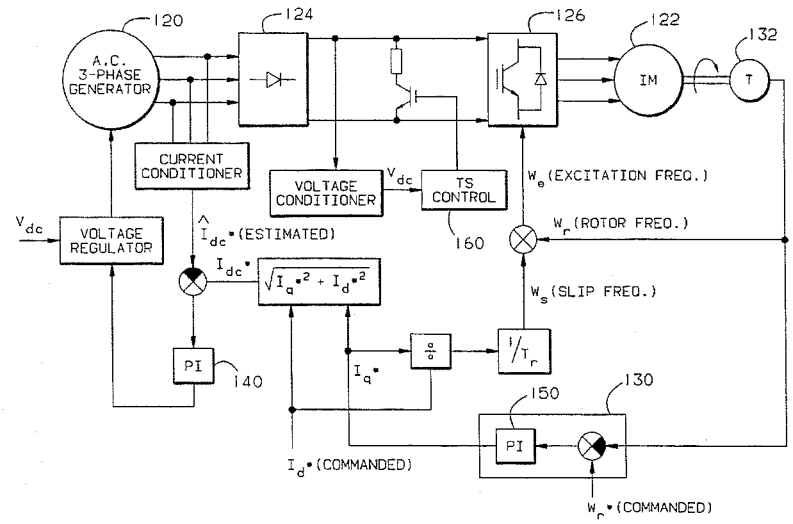

SC = SENSE COIL
SC-1,2,3 ARE 120 ELEC DEGREE APART FOR THREE PHASE

SC = SENSE COIL

SC-1,2,3 ARE 120 ELEC DEGREE APART FOR THREE PHASE

ND APPARATUS FOR
METHOD AND APPARATUS FOR CONTROLLING INDUCTION MOTORS

BACKGROUND AND SUMMARY OF THE INVENTION

The present invention relates generally to control methods for induction motors and, more particularly, to induction motor speed control systems for use in aircraft.

Induction motors have been employed for various purposes in aircraft products. It has, for example, been proposed to use an induction motor system in an Advanced Ducted Propulsion (ADP) fan pitch control system having a dedicated generator mounted to the engine in order to provide electric power to drive the induction motor.

Previously, high performance induction motor controls for similar applications have employed a field orientation technique called "vector control". The objective of vector control is to control the induction motor as a shunt wound d.c. motor by controlling the field excitation (the magnetizing current) and the torque producing current separately. In other words, the stator current of the induction motor is resolved into separately controllable torque producing and flux producing components. This can be accomplished, for example, by locking the phase of the reference system such that rotor flux is aligned entirely in the d-axis. The main issue in vector control methods is the acquisition of the fundamental flux wave of the motor rotor representing the synchronous frame of reference for field orientation. Based upon the methods of obtaining rotor flux information, the vector control technique is typically termed either "direct" or "indirect" sensing.

Direct sensing methods, for example, can employ Hall effect sensors or other magnetic induction elements to measure the air gap flux vector. However, such d.c. current sensors can be relatively expensive and unreliable in the high temperature environments of aircraft engines.

Indirect sensing methods are typically based on a voltage or a current (slip frequency) model of the induction motor. The current model based indirect method estimates the rotor flux vector from stator currents and rotor speed or position. In other words, slip frequency is estimated as a function of rotor time constant and torque and the flux producing components of the stator current. A disadvantage of this method is that a rotor speed/position sensor is required, such as a resolver mounted on the induction motor shaft. Thus, the motor control costs are greater while system reliability may decrease since extra control hardware and connections are involved.

On the other hand, the voltage model based indirect method obtains the rotor flux vector by integrating the induced voltage detected directly via sense coils or calculated indirectly from stator currents and voltages. Sense coils are often less sensitive to variation in the motor operating parameters. However, the accuracy of this method is limited by the accuracy of integration, which is typically worse at zero and low speeds. At low speed operations an open loop slip control system can be used, but when the induction motor is already in motion (such as when it is being driven by the prime motor) the initial speed is not known. Thus, the appropriate slip command for an open loop control is not known.

Another disadvantage of prior vector control systems has been in the employment of PWM inverters to produce variable voltage and variable frequency power to the induction motor stator windings. In typical aircraft engine environments, such PWM inverters must include EMI filters to decrease noise to acceptable levels.

Accordingly, it is an object of the present invention to overcome these and other disadvantages in the prior art. The present invention achieves that by detecting rotor speed through the use of sense coils on the stator teeth. Voltage ripples caused by the rotor slots is detected by combining the signals of several such sense coils so that the fundamental voltage signal is cancelled or rejected and only the ripple voltages remain, a signal proportional to rotor speed. Several alternative methods for implementing that technique are discussed herein. At low induction motor speeds, the present invention filters out the voltage ripples and incident third harmonics and instead estimates rotor speed from the fundamental voltage. When the induction motor is already being driven by a prime mover, the present invention selects a proper initial frequency command for initial motor start by identifying rotor speed from the PWM inverter. Further, the present invention provides for using a generator to control voltage to the induction motor, with a PWM inverter to control frequency signals to the induction motor.

Other objects, advantages and novel features of the present invention will now become readily apparent to those skilled in the art from the following drawings and detailed descriptions.

DETAILED DESCRIPTION OF PREFERRED EMBODIMENTS

Figure 1:
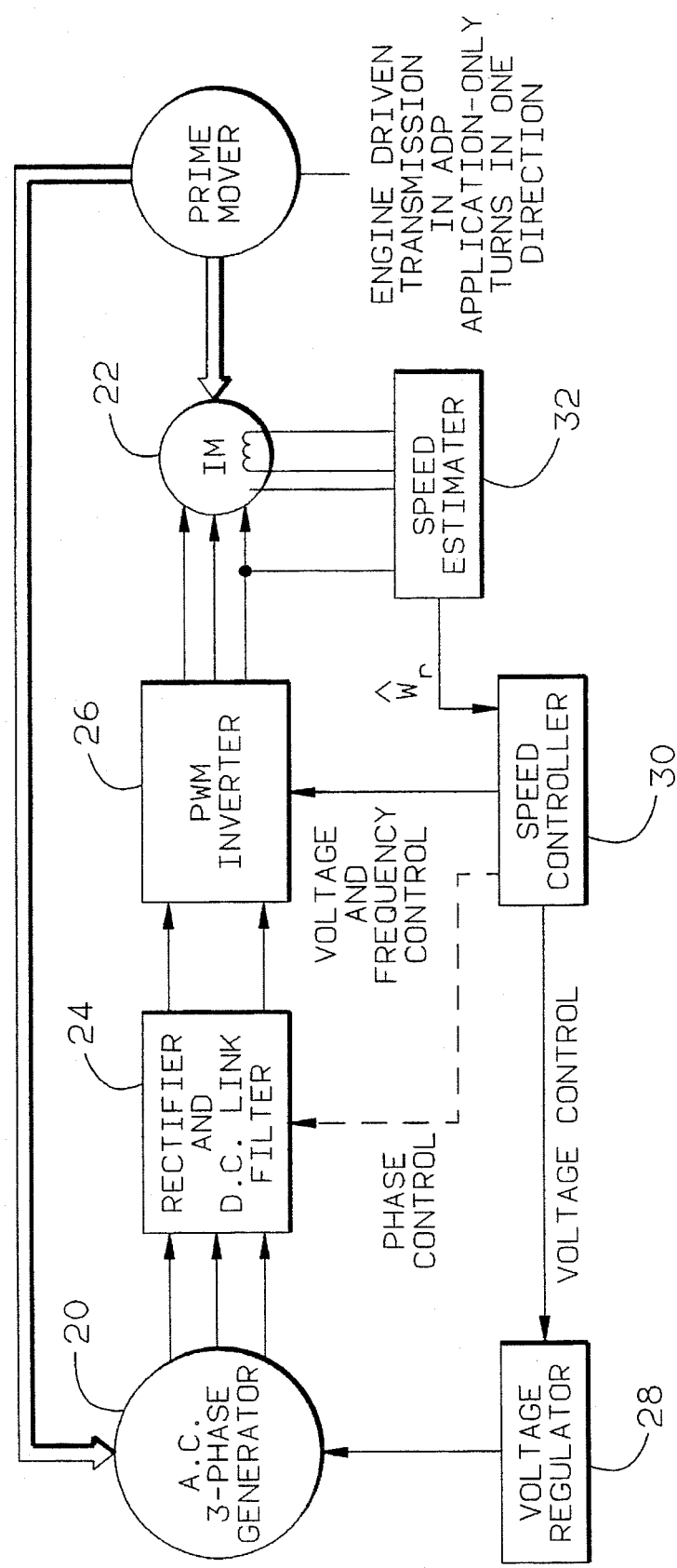
FIG. 1 shows an overall block diagram schematic of an induction motor control system according to the teachings of the present invention.

FIG. 1, illustrating a preferred embodiment of the present invention shows schematically an induction motor control system suitable for use with a ADP fan pitch system. This control system includes an A.C. generator 20, driven, for example, by an aircraft engine or prime mover, to provide electric power to induction motor 22 through rectifier and D.C. link filter 24 and then through PWM inverter 26. Induction motor 22, for example, provides motive power to a fan blade pitch change transmission. In this embodiment, generator 20 is dedicated to this function and has its output voltage controlled by regulator 28. Speed controller 30 provides the voltage control signals to regulator 28 and the voltage and frequency control signals to inverter 26. Speed estimator 32 provides the reference frequency signals to speed controller 30 according to sensed signals from inverter 26 and/or induction motor 22, as described further below. In certain embodiments where, for example, an unregulated generator 20 is employed, speed controller 30 can also provide phase control signals to rectifier 24.

Figure 2:
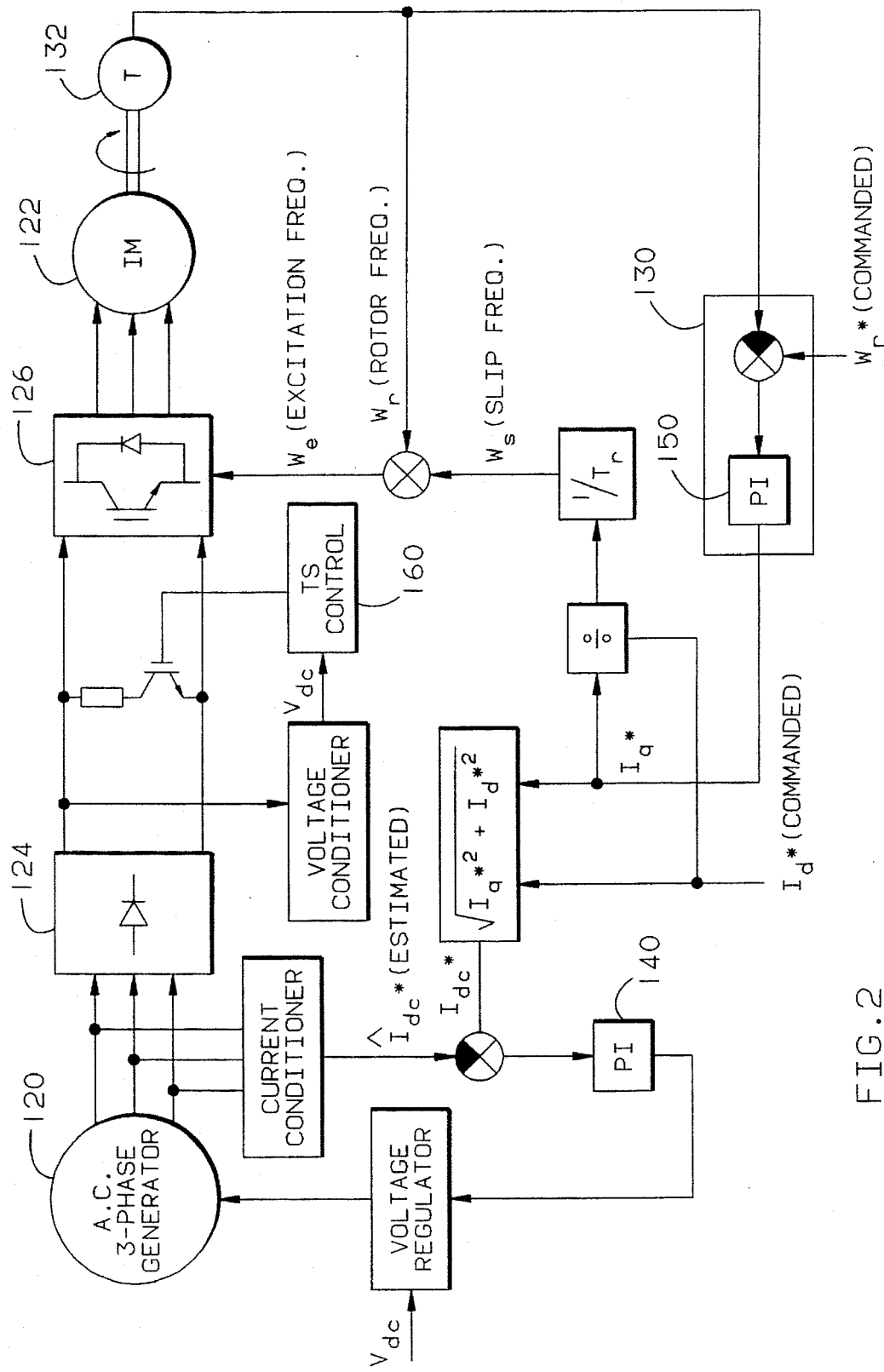
FIG. 2 shows a schematic of a baseline control system employing the voltage controlled generator features of the present invention.

The voltage control of generator 20 is a feature of the present invention which can be employed separately from the control system of FIG. 1 and is best understood by individual reference to that feature used in a baseline control system such as is shown schematically in FIG. 2. Briefly, instead of using the PWM inverter to control both frequency and voltage to the induction motor, the voltage is controlled by the generator and the PWM inverter controls only frequency. In this manner, a significant reduction in switching frequency noise is achieved.

More specifically, in a baseline control system 100 using indirect field orientation sensing the stator currents of induction motor 122 are controlled by voltage regulation of generator 120 with signals through rectifier 124 and PWM inverter 126. The D.C. link current is estimated from the generator current transformers in accordance with the following equation:

$$\hat{I}_{dc} = \frac{\pi}{\sqrt{6}} I_{ac}$$

The D.C. link current cosand is responsive to the flux and torque producing current components $I_d$ and $I_q$ as follows:

$$I_{dc}^* = \sqrt{I_d^{*2} + I_q^{*2}}$$

The current loop includes a proportional integral (PI) regulator 140. The output of the PI regulator provides an input to voltage regulator 128, which in turn controls excitation of generator 120 via a dual switch exciter drive. That type of drive is preferred in order to obtain a rapid response (approximately 100 Hz) from the generator. The command $I_q^*$ is generated from the output of the speed controller 130, shown here to include reference speed signals $\omega_r^*$ summed with a negative speed feedback signal from tachometer 132 and then output from a PI compensator 150.

In this embodiment, frequency control is achieved by summing the rotor speed with the command slip frequency as follows:

$$\omega_e = \omega_r + \omega_s$$

where $$\omega_s = \frac{R_r}{L_r} \frac{I_q^*}{I_d^*}$$

Transient suppressor 160 is preferred to handle the regenerative power and turns itself on when the D.C. link voltage increases past a predetermined threshold level.

Figure 3:
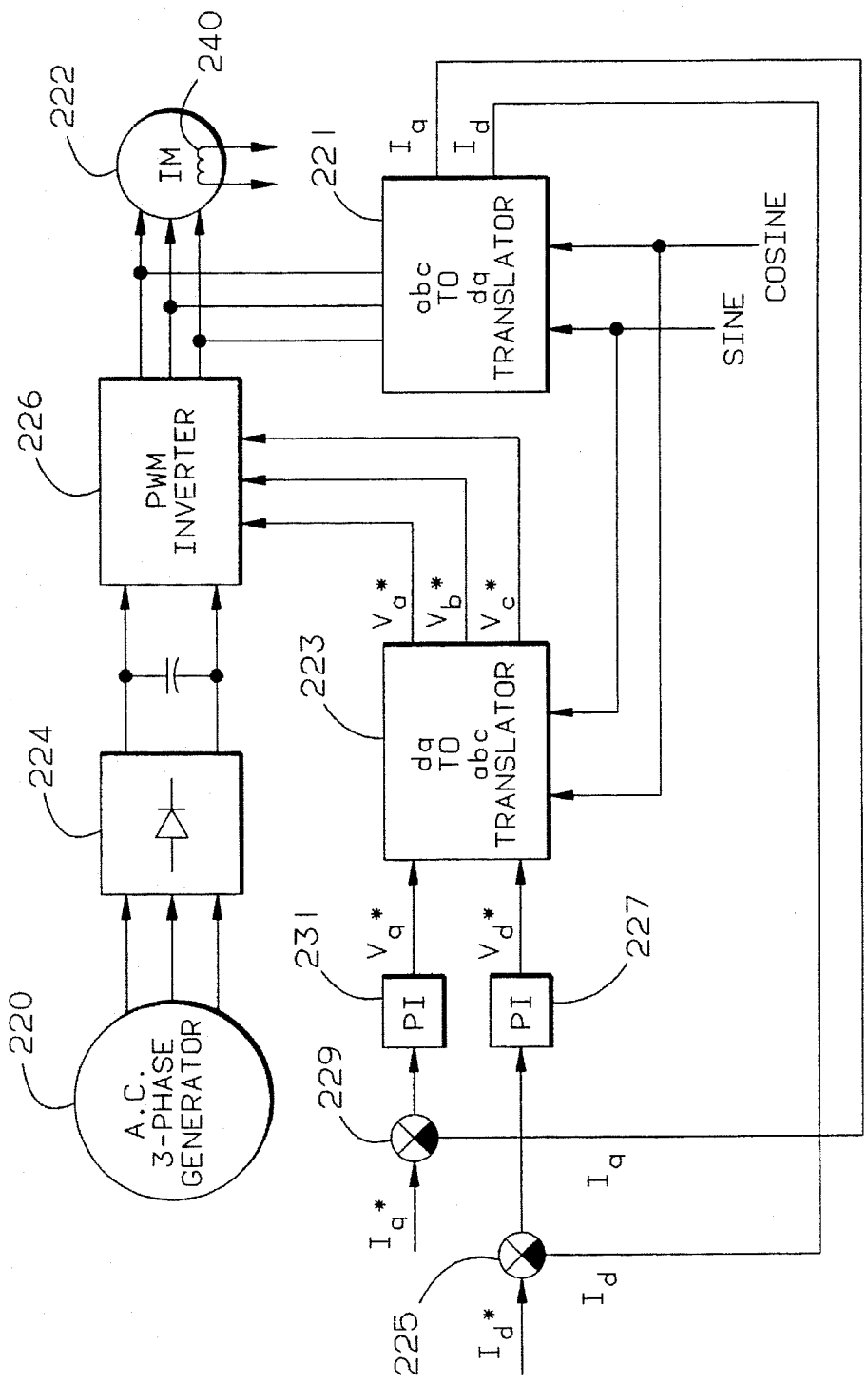
FIG. 3 shows a schematic of a baseline control system employing the rotor speed estimation features of the present invention.

Several speed estimation methods are available with the subject invention and are also best understood by reference individually to a baseline induction motor control system 200, such as is shown in FIG. 3, having three phase A.C. generator 220, rectifier 224, PWM inverter 226 and induction motor 222. The current loop is preferably implemented in the synchronous reference frame. Therefore, a translator 221 from the rotating frame of reference, or a-b-c frame, to the synchronous frame of reference, or d-q frame, is utilized. The $I_d$ component of the stator current produces magnetizing current for induction motor 220, while the $I_q$ component produces the electromagnetic torque. However, since the PWM inverter 226 requires that its voltage commands be in the rotating frame, a translator 223 is utilized to transform the torque and magnetizing current signals from the synchronous frame of reference, or d-q reference, to the rotating frame of reference, or a-b-c reference. The inputs to this translator 223 are the voltage commands in the synchronous frame of reference which are calculated as the difference between the commanded magnetizing current in the actual magnetizing current calculated by summation means 225 and input through proportional integral element 227. The q voltage command is calculated similarly as a difference between the electromagnetic torque producing component of current commanded versus actual through element 229 as input through proportional integral element 231.

Figure 4:
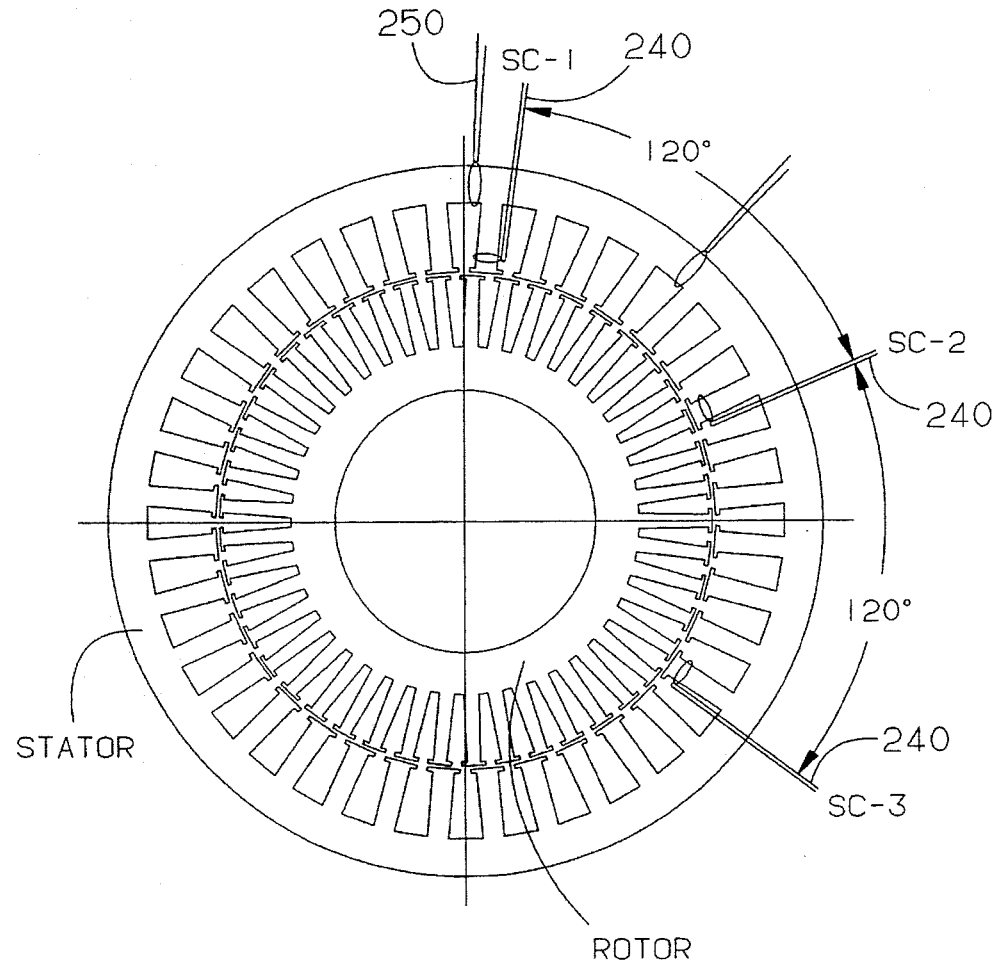
FIG. 4 shows an exemplary induction motor cross section illustrating placement of the speed estimation sense coils of the present invention.

Sense coils are provided in induction motor 222 as loops 240 on the stator teeth. As shown in FIG. 4, these sense coils are preferably located 120 electrical degrees apart in a three phase motor. One sense coil 250 is, for example, located on the stator back iron. This control method is based on the fact that the air gap flux is modulated by the slot ripple. Several methods are proposed to detect the rotor speed from the voltage ripple on the fundamental voltage signal due to the rotor slots.

Figure 5:
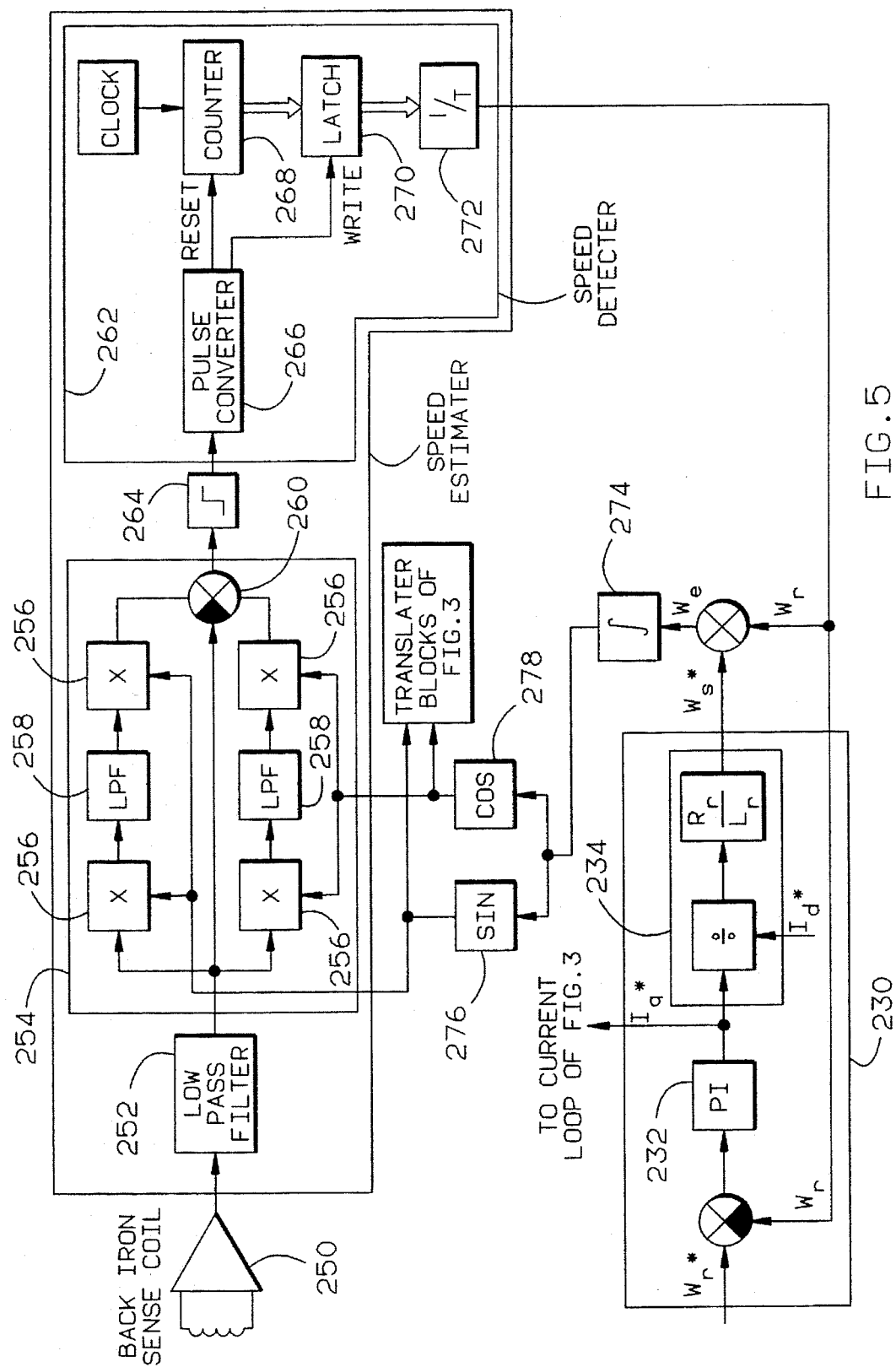
FIG. 5 shows a schematic of one embodiment of speed estimation and control according to the present invention for use in the baseline control system of FIG. 3.

FIG. 5 shows schematically one speed estimator 232 for calculating of rotor speed where only the back iron sense coil 250 is employed. Low pass filter 252 rejects the PWM frequency. A synchronous notch filter 254, including four multipliers 256, two low pass filters 258 and a summer 260, rejects the fundamental (speed) voltage signal component of the sense coil signal and passes the rotor slot components of the signal to a speed detector 262. This detector includes, for example, a zero cross detector 264, a pulse converter 266, a counter 268, a latch 270 and a block 272 which produces 1/T (period between rotor slots) and scales the output signal to the rotor speed. That output signal is now proportional to the rotor speed and is applied to a speed controller 230 having PI 232 and a slip calculator 234.

Slip calculator 234 computes $\omega_s^*$ from the stator current component references $I_q^*/I_d^*$ and rotor time constant ($1/T_r = R_r/L_r$), where $R_r$ is rotor resistance and $L_r$ is rotor self inductance. The commanded electrical frequency $\omega_e$ is the sum of the rotor speed $\omega_r$ and commanded slip frequency $\omega_s^*$. The electrical angular position is obtained at the output of integrator 274 (which is also scaled by the poles pair) and applied to sine and cosine functional blocks 276 and 278. The output of these functional blocks is in turn supplied to notch filter 254.

Figure 6:
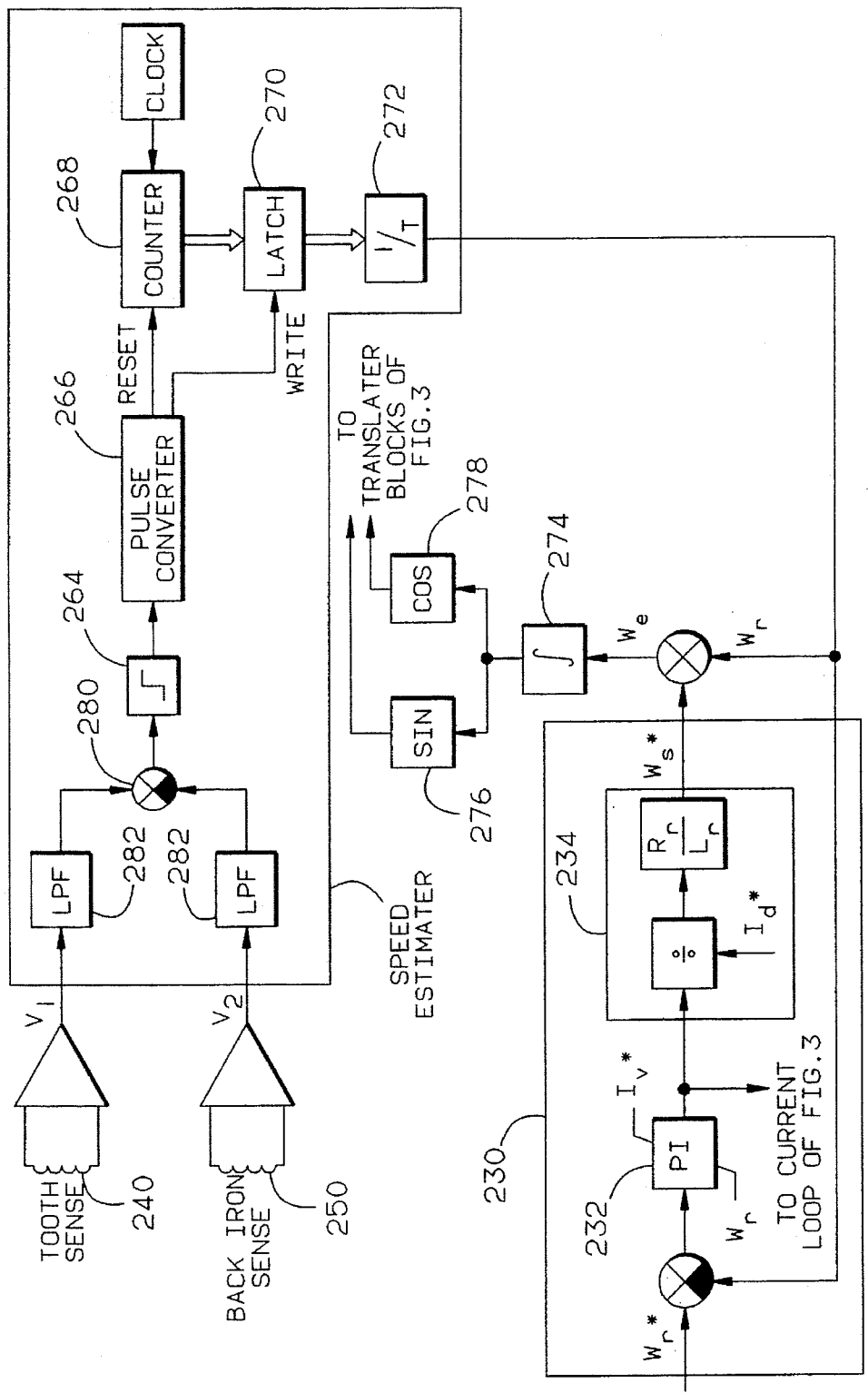
FIG. 6 shows a schematic of an alternative embodiment of speed estimation and control according to the present invention for use in the baseline control system of FIG. 3.

FIG. 6 shows, alternative, a diagram of schematic a single phase compensation technique for speed estimation for use when the induction motor is driven by a PWM inverter and a single sense coil 240 and back iron sense coil 250 are employed. In general, back iron sense coil 250 is used to compensate for the fundamental voltage and detect the rotor slot voltage on the output of summer 280 after voltage signals of each sense coil are subject to low pass filters 282. The reminder of the control system is analogous to that of FIG. 5.

Figure 7:
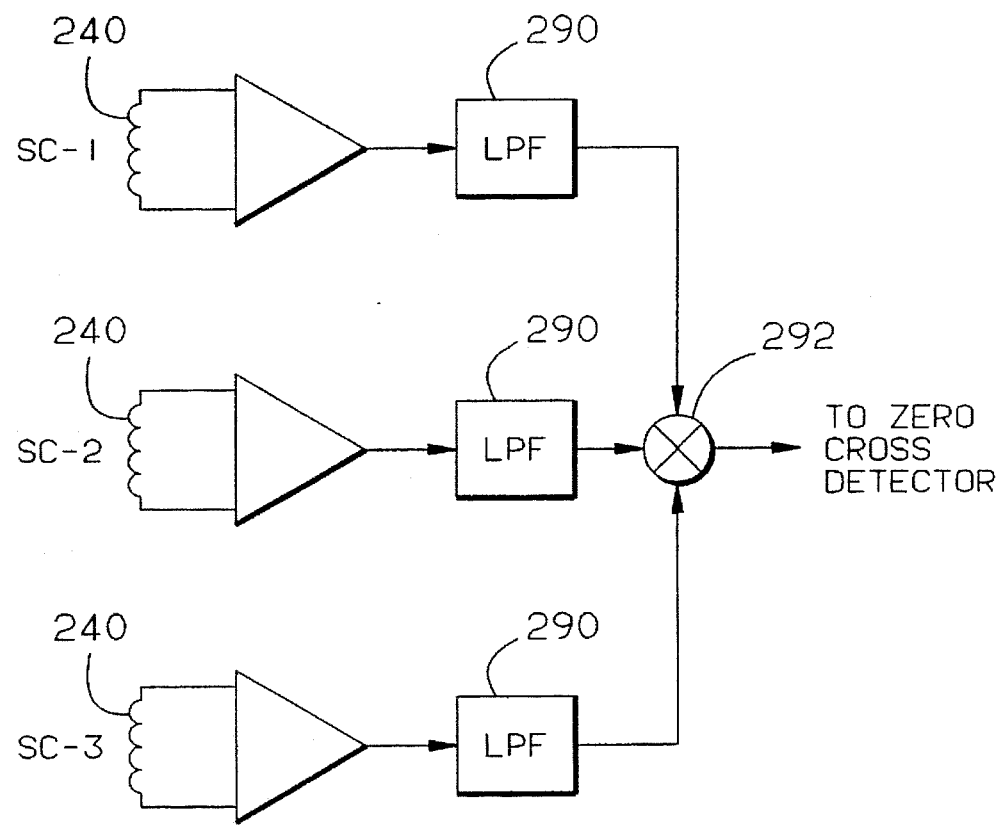
FIG. 7 shows a schematic of yet another alternative embodiment of speed estimation and control according to the present invention for use in the baseline control system of FIG. 3.
Figure 8:
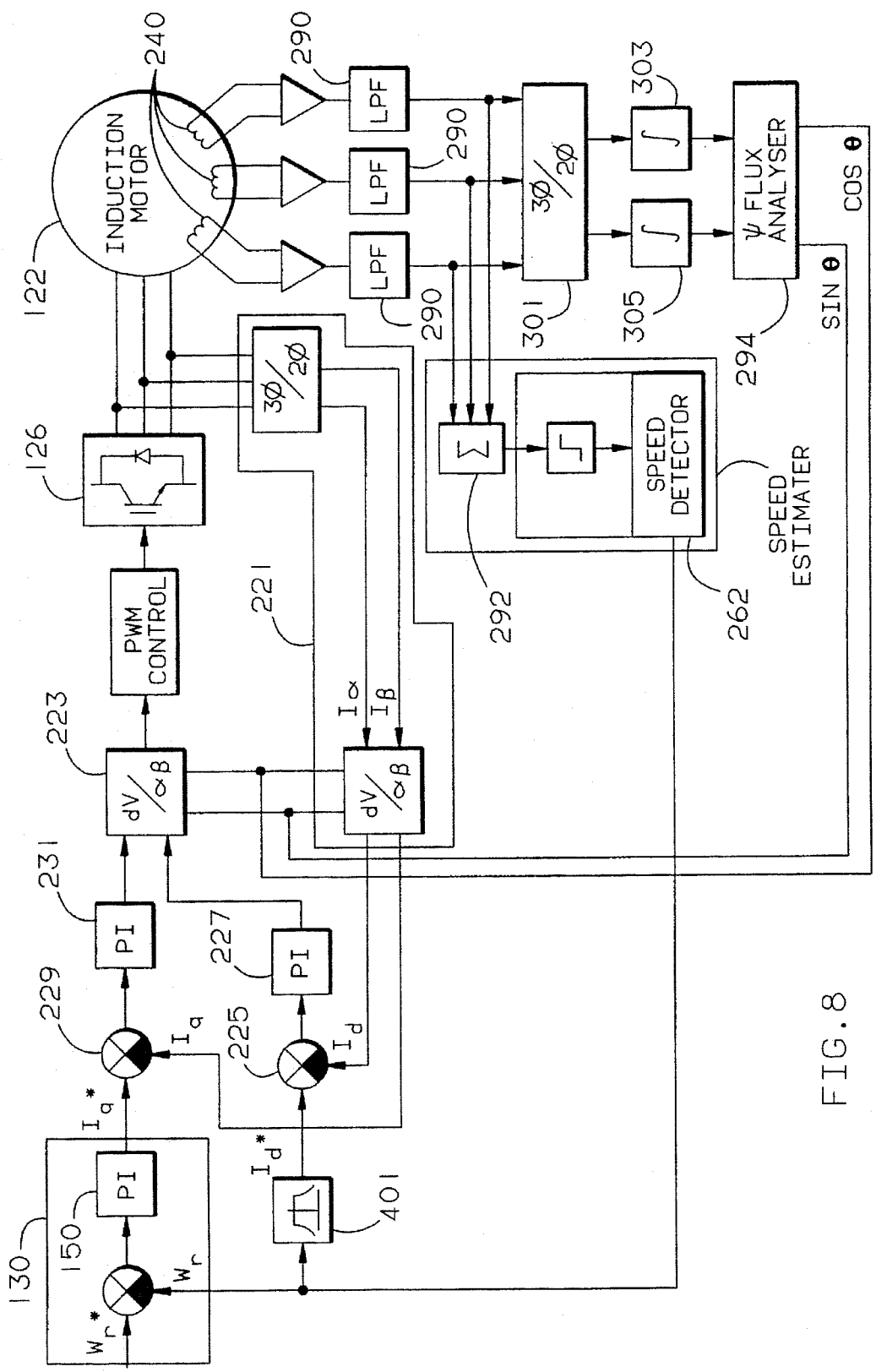
FIG. 8 shows a schematic of the embodiment of FIG. 7 specifically applied to the control system of FIG. 3.

Similarly, FIG. 7 shows, alternatively, a schematic diagram of a three phase compensation technique for speed estimation. The three sense coils 240, located 120 electrical degrees apart on the stator, provide signals to low pass filters 290 to reject PWM switching frequency. The resulting signals are then added by summer 292 to cancel out the fundamental voltage signal. As overall speed estimator and speed controller system using this three phase alternative is shown schematically in FIG. 8. The output from low pass filters 290, in addition to going to the summer 292, are input to a three phase to two phase translator 301 which outputs the d and q component of the signals. These signals are then integrated by integrators 303 and 305 and input to the flux analyzer 294. Flux analyzer 294 produces sine and cosine signals for the coordinate transformations while the speed detector signals calculated form the rotor slot ripples are used for speed control. As illustrated in FIG. 8, in addition to the calculation of the q component of the current by speed controller 130 described hereinabove, transformation element 401 converts the speed signal to the d component of the current to be used by element 225.

Figure 9:
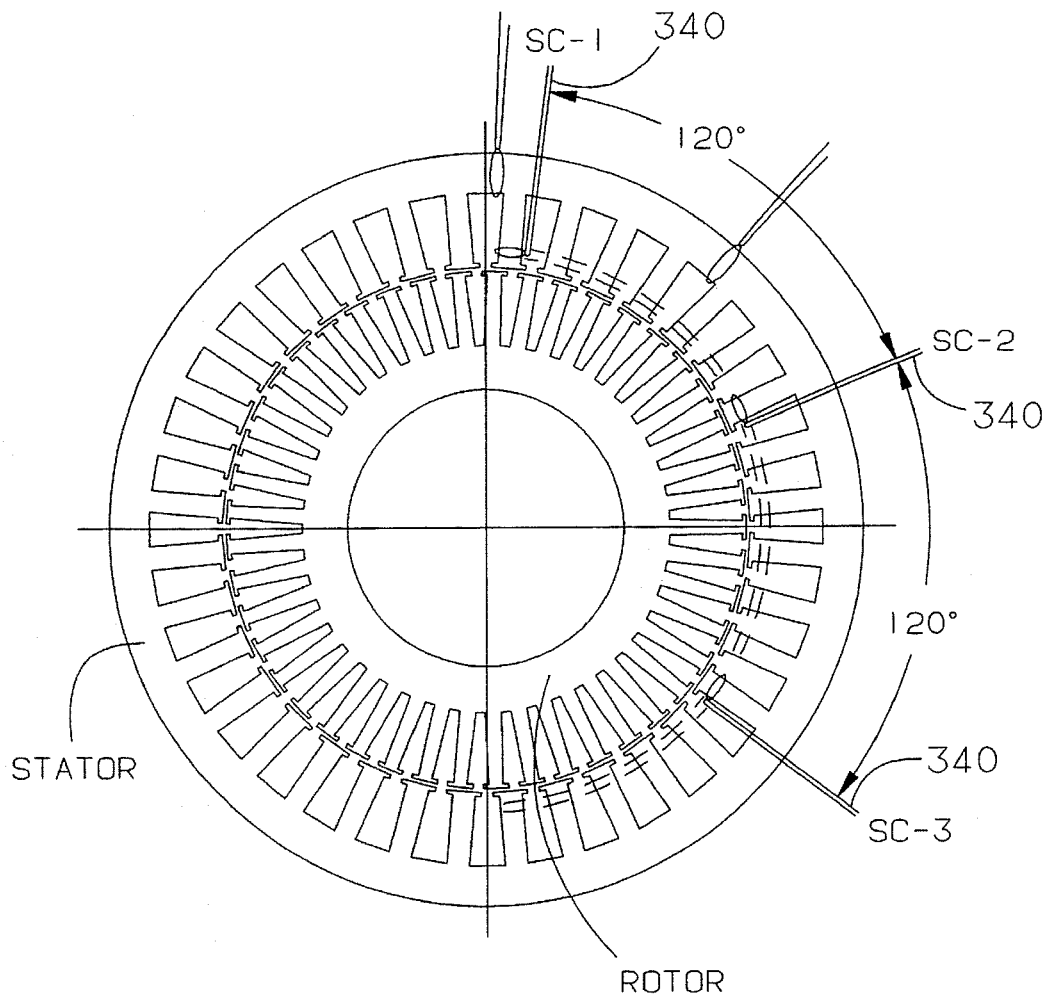
FIG. 9 shows an exemplary induction motor cross section illustrating placement of the low speed estimation sense coils of the present invention.
Figure 10:
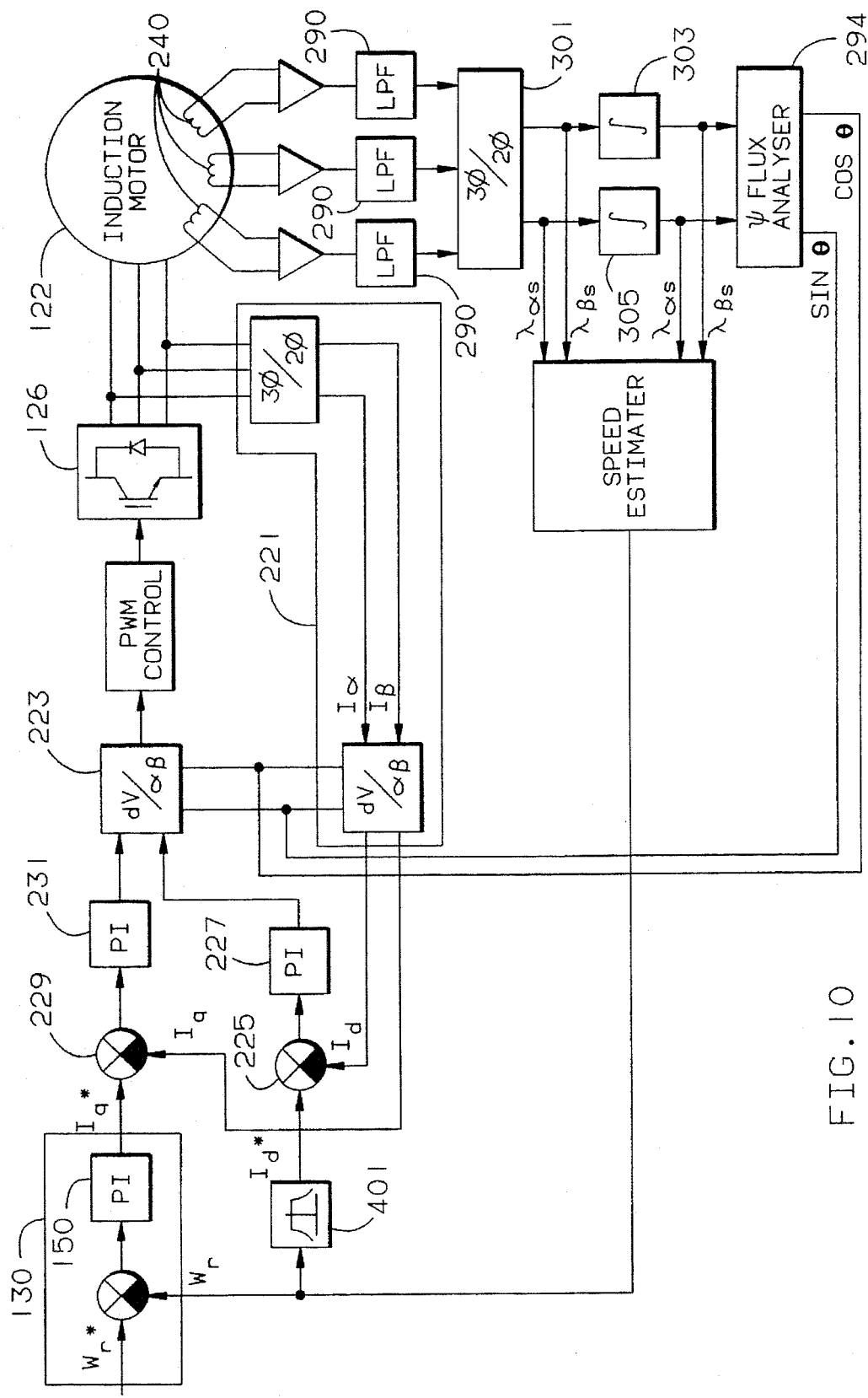
FIG. 10 shows a schematic of a low speed estimation system specifically applied to the control system of FIG. 3.

At low induction motor speeds, it has been found that magnetic saturation exists and a third harmonic frequency signal is introduced into the sense coil signals which is relatively difficult to filter out. In such situations, an alternative embodiment of the present employs three sense coils 340 wired around the pole pitch to include a plurality of stator teeth, as shown in FIG. 9. The outputs of these sense coils are voltage produced directly by the stator flux and are used estimate stator and rotor flux linkage in the control circuit of FIG. 10 according to the following equations:

$$\lambda_{\alpha_r} = \left(\frac{L_r}{L_m}\right)(\lambda_{\alpha_s} - \sigma L_s I_{\alpha_s})$$

$$\lambda_{\beta_r} = \left(\frac{L_r}{L_m}\right)(\lambda_{\beta_s} - \sigma L_s I_{\beta_s})$$

$$\sigma = \left(1 - \frac{L_m^2}{L_s} L_r\right)$$

$$\theta = \tan^{-1}\frac{\lambda_{\beta_r}}{\lambda_{\alpha_r}}$$

The estimated flux linkages and voltages from these sense coils are used to estimate synchronous frequency according to the following equation:

$$\omega_e = (\lambda_{\alpha_r}\lambda_{\beta_r} - \lambda_{\beta_r}\lambda_{\alpha_r})/((\lambda_{\alpha_r})^2 + (\lambda_{\beta_r})^2)$$

The rotor speed is estimated by the following equations:

$$\omega_r = \omega_e - \omega_s$$

$$\omega_s = (I_q^*/I_d^*)(R_r/L_r)$$

Figure 11:
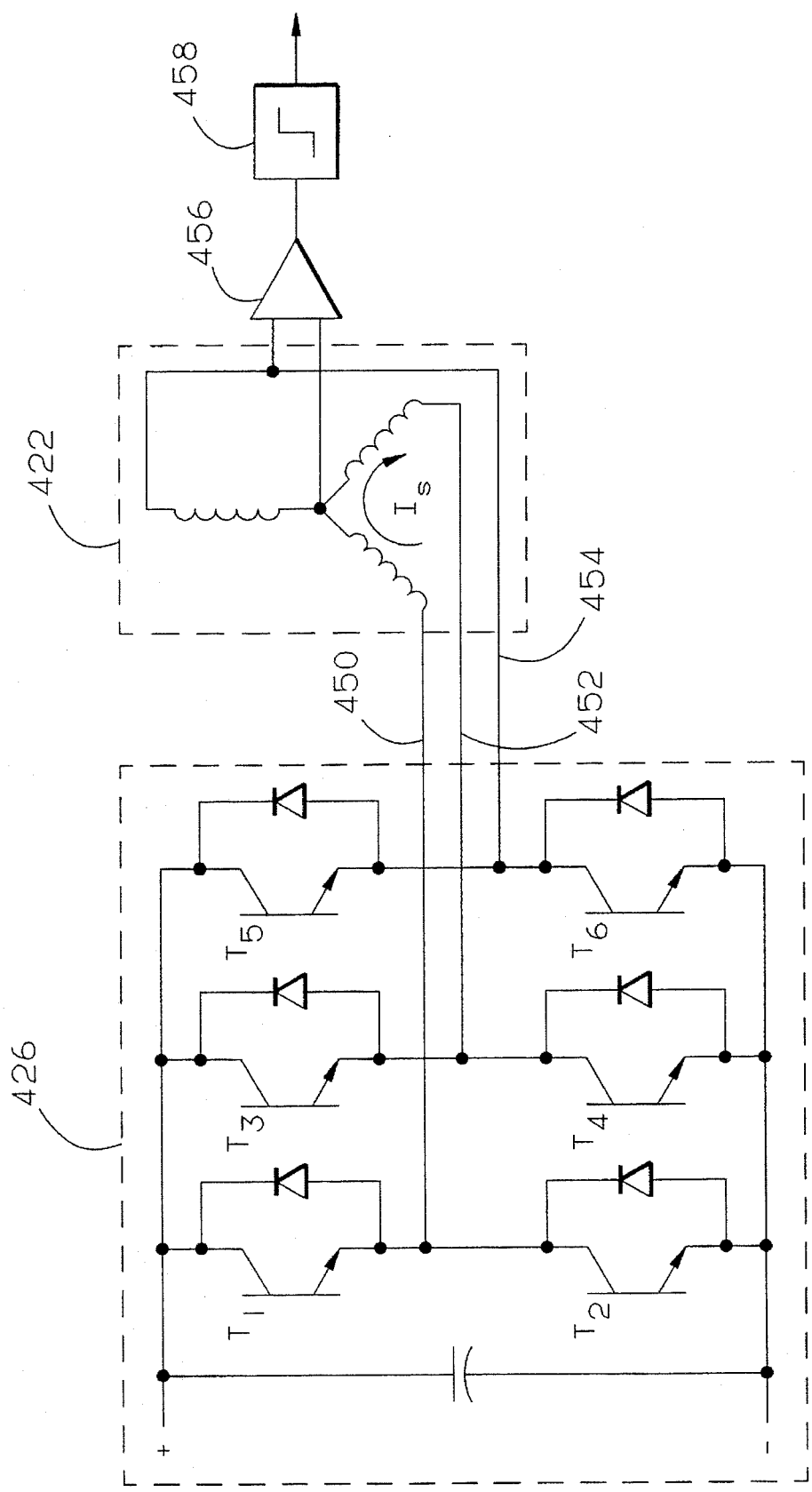
FIG. 11 shows a schematic portion of the PWM inverter and induction motor of the present invention for use in speed estimation when the motor is already being driven by a prime mover.
Figure 12:
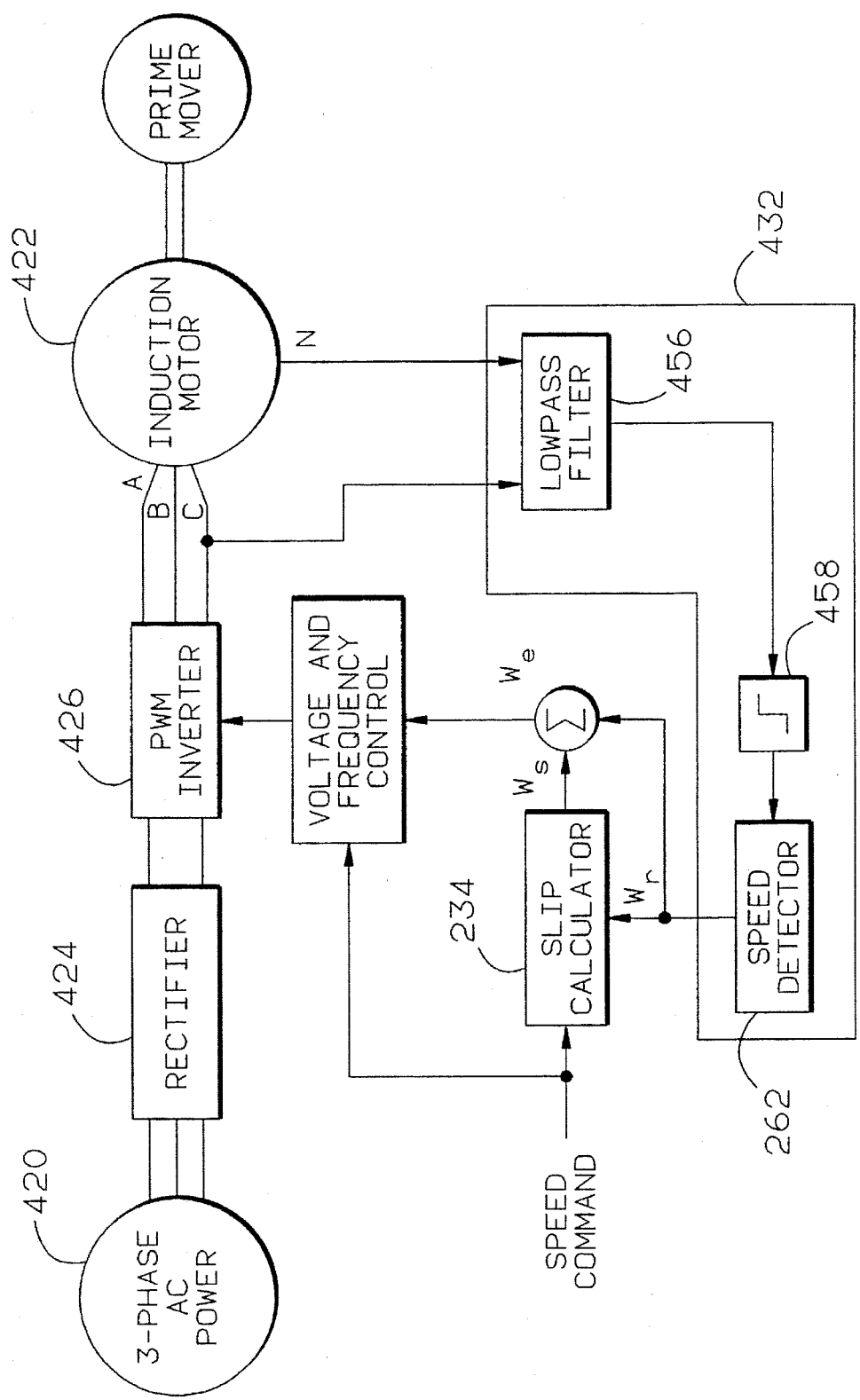
FIG. 12 shows a schematic of a method of detecting induction motor speed for use with the arrangement of FIG. 11 as applied to a baseline control system.

Further, the present invention provides an arrangement for identifying rotor speed when the induction rotor is already being driven by a prime mover. Specifically, during initial start, two phase legs 450 and 452 of PWM inverter 426 are supplied with D.C. current to the induction motor 422, while the third phase leg 454 is kept open, as shown in FIG. 11. The voltage speed induced in the third phase leg includes a signal having a frequency equal to a product of the number of and the rotor speed. That signal is applied to low pass filter 456 to filter out the PWM switching frequency. The analog signal detected thereby is passed through a zero cross detector 458, to produce a pulse train output signal having a frequency which is proportional to the rotor speed. Various methods can be used to detect this frequency and use it to select a proper frequency command for initial start of induction motor 422, as shown in FIG. 12.

Although the present invention has been described above in detail with respect to certain preferred embodiments, the same are by way of illustration and example only, and not to be taken as limitations since those of ordinary skill in this act will now recognize that several variations are contemplated by the present invention. Accordingly, the spirit and scope of the present invention are only limited by the attached claims.

We claim:

1. A control system for an induction motor, comprising:

an inverter having a DC input coupled to a source of DC power, a polyphase output coupled to the induction motor, and a plurality of inverter control inputs, said inverter supplying AC voltage and current to the induction motor, said current having components producing flux and torque within the induction motor;

means in sensory communication with the induction motor for estimating the speed of the induction motor, said speed estimating means generating a reference frequency signal representative of the induction motor speed;

current sensing means in sensory communication with said polyphase output of said inverter for monitoring said current supplied to the induction motor, said current sensing means generating output current sense signals proportional to said current supplied to the induction motor; and a speed controller having sense inputs coupled to said current sensing means, control inputs coupled to said speed estimating means, and control outputs coupled to said inverter, said speed controller calculating a first torque producing component and a first flux producing component of induction motor current based on said reference frequency signal, and a second torque producing component and a second flux producing component of induction motor current based on a transformation of said output current sense signals from a stationary reference frame to a synchronous reference frame, said speed controller generating output inverter control signals based on a difference therebetween; and wherein said inverter generates polyphase AC power of variable frequency in response to said inverter control signals to drive the induction motor at variable speeds.

2. The control system of claim 1, wherein said source of DC power comprises:

a generator having a drive input coupled to a prime mover and at least one output phase of AC electric power; and a rectifier having an AC input coupled to said at least one output phase of said generator and a DC output coupled to said DC input of said inverter, said rectifier rectifying said AC electric power into DC electric power.

3. The control system of claim 2, further comprising:

at least one current transformer in sensory communication with said at least one output phase of said generator, said at least one current transformer generating an output generator current sense signal proportional to current flow in said at least one output phase of said generator;

an AC current conditioner having an input for receiving said output generator current sense signal and an output, said current conditioner calculating an estimated DC current signal on said output, said estimated DC current signal being an estimation of DC current supplied to said inverter from said rectifier;

a current control loop responsive to said torque producing component of induction motor current calculated by said speed controller, a flux producing component of induction motor current command signal, and said estimated DC current signal for generating an output voltage control signal; and a voltage regulator responsive to said output voltage control signal and a voltage command signal for controlling excitation of said generator.

4. The control system of claim 3, wherein said AC current conditioner calculates said DC current signal in accordance with the following equation:

$$\hat{I}_{dc} = \frac{\pi}{\sqrt{6}} I_{ac}.$$

5. The control system of claim 3, wherein said current control loop comprises:

summation means for calculating a difference between said estimated DC current signal and a commanded DC current signal, said commanded DC current signal being calculated as the square root of the sum of the squares of said torque producing component of the induction motor current and said flux producing component of the induction motor current control signal; and a proportional integral regulator responsive to said difference calculated by said summation means for generating said output voltage control signal.

6. The control system of claim 3, wherein said voltage regulator comprises a dual switch exciter drive.

7. The control system of claim 1, wherein said speed estimating means is a tachometer.

8. The control system of claim 1, wherein said inverter operates to supply DC current through a first and a second phase of said polyphase inverter output thereby inducing a voltage signal on a third phase of said inverter polyphase output when the induction motor is being mechanically driven by a prime mover, said induced voltage signal having a frequency corresponding to the speed of the induction motor, and wherein said speed estimating means comprises:

a low pass filter having an input and an output, said input electrically coupled to said third phase of said inverter polyphase output, said low pass filter generating a filtered signal on said output in response to said induced voltage signal; and a speed detector having an input coupled to said output of said low pass filter, and an output, said speed detector generating said reference frequency signal on said output.

9. The control system of claim 1, wherein said speed estimating means comprises:

at least one sense coil in sensory communication with the stator of the induction motor, said at least one sense coil generating an output voltage sense signal having a ripple voltage component proportional to the speed of the induction motor;

at least one low pass filter coupled to said at least one sense coil for filtering inverter switching frequency components from said output voltage sense signal, said low pass filter producing a filtered voltage sense signal; and a speed detector having an input coupled to said output of said low pass filter, and an output, said speed detector generating said reference frequency signal on said output.

10. The control system of claim 9, wherein said at least one sense coil is positioned on the back iron of the stator, and wherein said speed estimating means further comprises a synchronous notch filter interposed between said low pass filter and said speed detector, said synchronous notch filter rejecting a fundamental voltage component of said output voltage signal, and wherein said speed controller further comprises a slip calculator for determining slip frequency of the induction motor based on the scaled quotient of said first flux producing component and said first torque producing component of the induction motor current, said slip frequency being summed with said reference frequency signal to determine a commanded electrical frequency for the induction motor, said speed controller further comprising an integrator for determining an electrical angular position based on said commanded electrical frequency, and a sine and a cosine functional circuit block having an input coupled to said integrator, and an output, said sine functional circuit block generating an output sine control signal, said cosine functional circuit block generating an output cosine control signal.

11. The control system of claim 10, wherein said synchronous notch filter comprises:

a first multiplier circuit having an input coupled to said low pass filter and an output, said first multiplier circuit calculating the product of said output voltage sense signal and said output sine control signal;

a second low pass filter having an input coupled to said output of said first multiplier circuit and an output, said second low pass filter generating a filtered sine product signal;

a second multiplier circuit having an input coupled to said second low pass filter and an output, said second multiplier circuit calculating the product of said filtered sine product signal and said output sine control signal;

a third multiplier circuit having an input coupled to said low pass filter and an output, said third multiplier circuit calculating the product of said output voltage sense signal and said output cosine control signal;

a third low pass filter having an input coupled to said output of said third multiplier circuit and an output, said third low pass filter generating a filtered cosine product signal;

a fourth multiplier circuit having an input coupled to said third low pass filter and an output, said fourth multiplier circuit calculating the product of said filtered cosine product signal and said output cosine control signal; and a summer circuit having a first input coupled to said output of said second multiplier, a second input coupled to said output of said fourth multiplier, and an inverting input coupled to said low pass filter, and an output, said summer circuit rejecting a fundamental component of said output voltage signal.

12. The control system of claim 1, wherein said speed estimating means comprises:

at least two sense coils in sensory communication with the stator of the induction motor, each of said at least two sense coils generating an output voltage sense signal having a ripple voltage component proportional to the speed of the induction motor;

at least one low pass filter coupled to each of said at least two sense coils for filming inverter switching frequency components from said output voltage sense signals, each low pass filter producing a filtered voltage sense signal;

a summer circuit having an input for receiving a filtered voltage sense signal from each low pass filter and an output, said summer circuit canceling a fundamental voltage component of said filtered voltage sense signals on said output; and a speed detector having an input coupled to said output of said summer circuit, and an output, said speed detector generating said reference frequency signal on said output.

13. The control system of claim 12, wherein one of said at least two sense coils is positioned on the back iron of the stator, and wherein another of said at least two sense coils is positioned on a stator tooth.

14. The control system of claim 1, wherein said speed estimating means comprises:

at least three sense coils in sensory communication with the stator of the induction motor, each of said at least three sense coils generating an output voltage sense signal having a ripple voltage component proportional to the speed of the induction motor;

at least one low pass filter coupled to each of said at least three sense coils for filtering inverter switching frequency components from said output voltage sense signals, each low pass filter producing a filtered voltage sense signal;

a summer circuit having an input for receiving a filtered voltage sense signal from each low pass filter and an output, said summer circuit canceling a fundamental voltage component of said filtered voltage sense signals on said output; and a speed detector having an input coupled to said output of said summer circuit, and an output, said speed detector generating said reference frequency signal on said output.

15. The control system of claim 14, wherein each of said at least three sense coils are positioned on stator teeth 120 electrical degrees apart.

16. The control system of claim 1, wherein said speed estimating means comprises:

at least three sense coils in sensory communication with the stator of the induction motor, each of said at least three sense coils generating an output voltage sense signal having a ripple voltage component proportional to the speed of the induction motor;

at least one low pass filter coupled to each of said at least three sense coils for filtering inverter switching frequency components from said output voltage sense signals, each low pass filter producing a filtered voltage sense signal;

means for transforming said filtered voltage sense signals from a stationary reference frame to a synchronous reference frame to produce output signals which are proportional to the derivative of stator flux; and means for integrating said output signals which are proportional to the derivative of stator flux, said integration means producing signals proportional to the stator flux; and wherein said speed estimating means calculates commanded electrical frequency from said output signals which are proportional to the derivative of stator flux and signals proportional to the stator flux, and calculates slip frequency as the scaled quotient of the torque producing component of induction motor current to the flux producing component of induction motor current, said speed estimating means further calculating said reference frequency signal by subtracting slip frequency from commanded electrical frequency.

17. The control system of claim 16, wherein each of said at least three sense coils are positioned on the pole pitch of the induction motor to include a plurality of stator teeth.

\* \* \* \* \*